March 6, 1934.  J. L. PATERSON ET AL  1,949,874

PUMP VALVE

Filed Feb. 6, 1929

INVENTORS
John L. Paterson &
Albert B. Edwards
By Munn & Co
ATTORNEYS.

Patented Mar. 6, 1934

1,949,874

UNITED STATES PATENT OFFICE 1,949,874

PUMP VALVE

John L. Paterson and Albert B. Edwards,
Ventura, Calif.

Application February 6, 1929, Serial No. 337,989

20 Claims. (Cl. 251—144)

Our invention relates to valves for pumps handling fluids and particularly, although not necessarily, valves for pumps of the character used in the drilling of oil wells, for pumping mud, slush, cement, oil, water etc.

It is a purpose of our invention to provide a pump valve embodying a valve element characterized by its reversibility with respect to a valve seat, to seal the port controlled by the element, so that when one seat engaging portion of the valve element has become worn to the extent of failing to properly seal the port, the element can be reversed with respect to its seat and present a new seat engaging portion to the seat for sealing of the port, thereby greatly prolonging the effective life of the valve and reducing to a minimum the necessity for replacement with the attendant expense and loss of time.

It is another purpose of our invention to provide a pump valve embodying a valve element including a cushioning element for cushioning the impact against a valve seat, of a seat engaging member movably mounted on the valve stem, with means for producing a fluid tight seal between the member and stem and between the valve element and the seat when the member is forced against the seat, thereby positively preventing leakage of fluid between these parts when the valve is closed.

It is a further purpose of our invention to provide a pump valve embodying a valve element reversible with respect to a valve seat to present to the seat, one seat engaging member or another movably mounted on a valve stem, with means for cushioning the impact of one member or the other against the valve seat and for producing a fluid tight seal between the members and stem and between the valve element and seat when one member or the other is forced against the seat.

It is a further purpose of our invention to provide a pump valve characterized by its structural simplicity, ease of assembling and disassembling of its parts to permit ready removal of any of the parts when worn and the replacement thereof with new parts.

We will describe only one form of pump valve embodying our invention and will then point out the novel features thereof in claims.

In the accompanying drawing.

Figure 1:
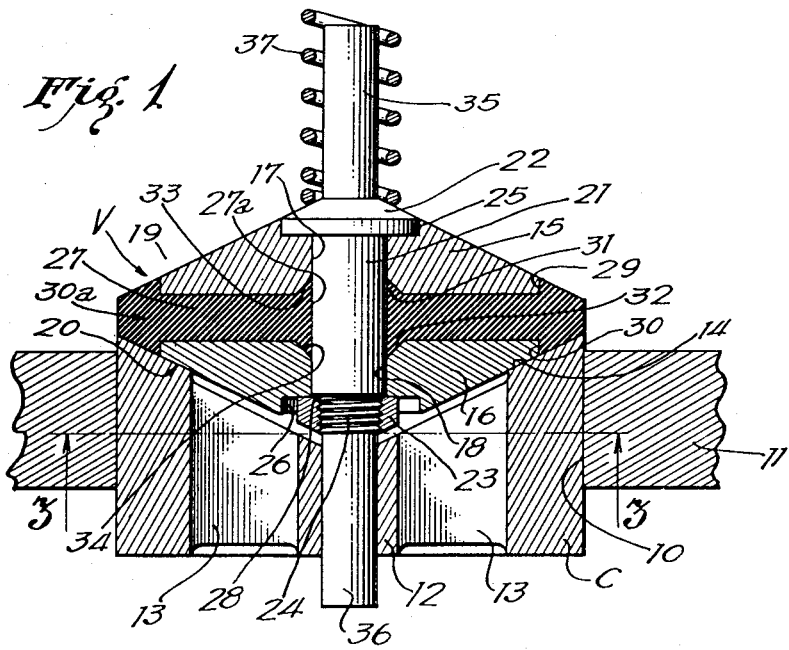
Fig. 1 is a view showing in vertical central section, one form of valve embodying our invention, in applied position to a pump body.
Figure 2:
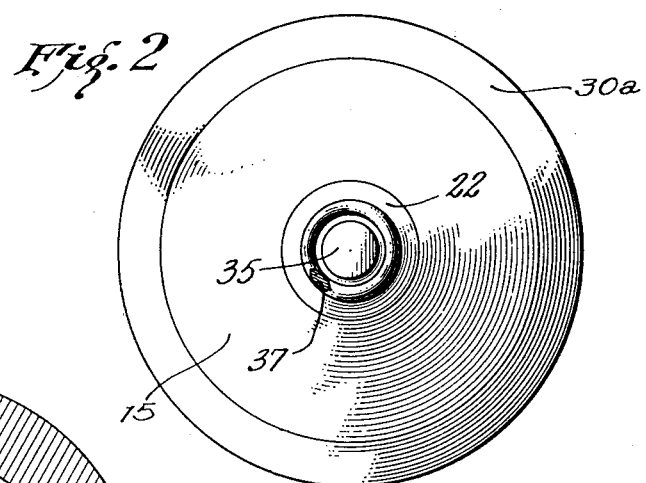
Fig. 2 is a plan view of the valve.
Figure 3:
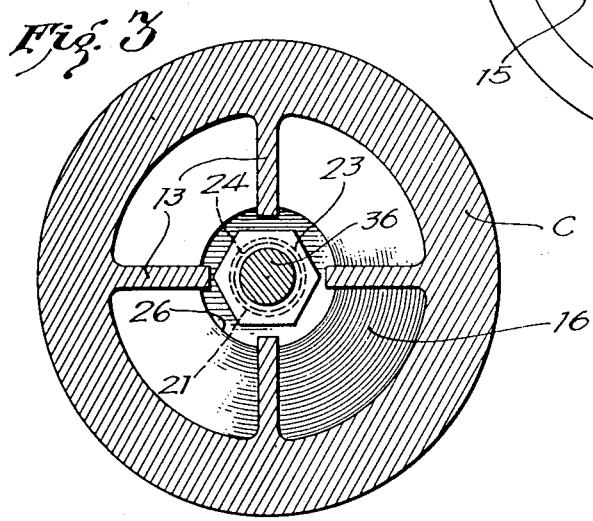
Fig. 3 is a horizontal sectional view taken on the line 3—3 of Fig. 1 and looking in the direction of the arrows.

Referring specifically to the drawings in which similar reference characters designate similar parts in each of the several views, our invention in its present embodiment comprises a valve cage C of annular form tapered exteriorly to have either a sliding or threaded fit within a port 10 of a pump body 11. The cage C is provided with a valve stem guide in the form of a sleeve 12 supported axially within the cage by radiating arms 13 formed integral with the sleeve and cage.

The cage C is further provided with a valve seat 14 of conical form with which a valve element V is adapted to engage to close the port 10. In the present instance the valve element V comprises a pair of seat engaging members 15 and 16 identical in construction and illustrated in the form of disks of metal having axial openings 17 and 18 respectively and seat engaging surfaces 19 and 20 respectively, complementary to the conical form of the valve seat 14. The axial openings 17 and 18 of the seat engaging members freely receive a valve stem 21, and the members are interposed between a fixed abutment 22 in the form of an annular shoulder on the stem 21 and a nut 23 threaded onto a reduced tapered threaded portion 24 formed on the stem. The seat engaging surfaces 19 and 20 of the members are recessed as indicated respectively at 25 and 26 to respectively receive the abutment 22 and nut 23; and between the members is interposed a cushioning element in the form of a disk-like body 27 of yieldable material such as resilient rubber for example which is provided with an axial opening 27a freely receiving the stem 21.

The nut 23 when threaded onto the portion 24 of the valve stem to abut an annular shoulder 28 on the stem, forms a fixed abutment which co-operates with the fixed abutment 22 to confine the members 15 and 16 and the body 27 on the stem and yet permit sliding movement of the members on the stem in a direction towards the body 27.

The body 27 is of larger diameter than the members 15 and 16 and is provided on opposite sides with circular recesses 29 and 30 receiving the members. The members are surrounded circumferentially by an annular portion 30a of the body 27 forming prolongations of the conical seat engaging surfaces 19 and 20.

The body 27 is provided on opposite sides with identical annular beads 31 and 32 surrounding the axial opening 27a of the body, and the beads are received in identical annular cam grooves 33 and 34 respectively, formed respectively in the confronting sides of the members 15 and 16. The beads and grooves co-act to form a fluid tight seal between the valve element V and the stem 21 when either the member 15 or 16 is forced against the valve seat 14, whereas the annular portion 30ª of the body forms a fluid tight seal between the valve element and the seat when one member or the other is forced against the valve seat.

The valve stem 21 is provided with identical extensions 35 and 36, axially alined and projecting outwardly from the outer sides of the members 15 and 16 respectively; and either of the stem extensions is adapted to be slidably received in the sleeve 12 to co-operate with the latter in guiding the valve element towards and away from the valve seat 14. A suitable spring 37 may be associated with either the stem extension 35 or 36 to aid in closing the valve rapidly.

It will be clear that as the seat engaging surfaces 19 and 20 of the members 15 and 16 are identical, and that as the stem extensions 35 and 36 are also identical, the valve element is rendered reversible with respect to the valve seat 14 so that when either the surface 15 or 16 becomes worn to such extent as to be unfit for further use, the other surface can be used to co-act with the seat by simply reversing or inverting the valve element V with respect to the seat, so that the effective life of the valve is greatly prolonged.

The operation of the valve is as follows:

Let it be assumed that the valve element V is associated with the valve cage C so that the seat engaging member 16 is adapted to co-act with the seat 14 of the cage and the stem extension 36 with the sleeve 12 as illustrated. In practice, fluid under pressure at the lower side of the valve element V will function to open the element to permit the fluid to pass through the cage, whereas should fluid attempt to return through the cage the valve element will be moved to its closed position. As the valve is forced to closed position under the fluid pressure, the seat engaging member 16 will forcibly strike the seat 14. Upon striking of the seat by the member 16, the latter, being slidable on the stem 21, will be free to move upwardly on the stem 21 and will compress or distort the body 27 of yieldable material against the member 15 so that the body will function as a cushion absorbing the shock of the impact and thus preventing damage to the member 16 and to the seat. As the member 16 is forced against the seat 14, the inclined surfaces of the cam grooves 33 and 34 will force the beads 31 and 32 of the body of yieldable material tightly against the stem 21 so as to form a fluid tight seal between the valve element and stem, while the annular portion 30ª of the body around the member 16 will be tightly pressed against the seat to form a fluid tight seal between the valve element and the seat. Thus any leakage of fluid past the valve is positively prevented.

When the seat engaging member 16 has become worn to such extent as to be rendered unfit for further use, the valve element V is merely inverted or reversed from the position shown in Fig. 1, so that the member 15 will co-act with the seat 14 and the stem extension 35 with the sleeve 12. In this reversed position, the member 15, upon striking the seat 14 will be cushioned by the body of yieldable material 27 as above described, and the beads 31 and 32 and grooves 33 and 34 will co-act to form a fluid tight seal between the valve element and valve stem, while the annular portion 30ª of the body 27 will form a fluid tight seal between the valve element and the valve seat around the member 15.

From the foregoing description it will be manifest that our invention in one of its broad aspects provides a valve element reversible with respect to a valve seat to form a closure when in one position or a reversed position, and that our invention in another of its broad aspects provides for the fluid tight sealing of a valve element with respect to its stem as well as with respect to the valve seat so as to positively prevent leakage past the valve when closed. Furthermore that this function of sealing is accomplished with a valve element regardless of whether the element is reversible with respect to its seat or not, as in a nonreversible valve element, either the member 15 or 16 could be considered as integral with either the abutment 22 or nut 23, and the other member movably mounted on the valve stem.

Although we have herein shown and described only one form of pump valve embodying our invention, it is to be understood that various changes and modifications may be made therein without departing from the spirit of the invention and the spirit and scope of the appended claims.

We claim:

1. In a valve of the character described, a valve stem having an abutment thereon, a valve element having a seat engaging member slidably mounted on the stem, a body of yieldable material surrounding the stem and interposed between the abutment and member, and means for forcing the body of yieldable material into fluid sealing engagement with the stem when the member is forced against a valve seat comprising an annular bead on the body of yieldable material, and an annular cam groove on the member receiving the bead.

2. In a valve of the character described, a valve stem having an abutment thereon, a valve element having a seat engaging member slidably mounted on the stem, a body of yieldable material surrounding the stem and interposed between the abutment and member for cushioning the impact of the member against a valve seat, and a bead on the body of yieldable material surrounding the valve stem, the member having a groove receiving the bead and provided with a cam surface operable to force the body of yieldable material into fluid sealing engagement with the stem when the member is forced against the valve seat.

3. In a valve of the character described, a valve stem having an abutment thereon, a valve element having a seat engaging member slidably mounted on the stem, a body of yieldable material surrounding the stem and interposed between the abutment and member for cushioning the impact of the member against a valve seat, the body having a recess receiving the member to provide a lip on the body surrounding the marginal edge of the member and engageable with the valve seat to form a fluid tight seal between the valve element and seat when the member is forced against the valve seat.

4. In a valve of the character described, a valve stem having an abutment thereon, a valve element having a seat engaging member slidably mounted on the stem, a body of yieldable material surrounding the stem and interposed between the abutment and member for cushioning the impact of the member against a valve seat, the body having a recess receiving the member to provide a lip on the body surrounding the marginal edge of the member and engageable with the valve seat to form a fluid tight seal between the valve element and seat when the member is forced against the valve seat, and a bead on the member surrounding the valve stem, the member having a groove receiving the bead and provided with a cam surface operable to force the body of yieldable material into fluid sealing engagement with the stem when the member is forced against the valve seat.

5. In a valve, a valve stem having a pair of spaced abutments thereon, a reversible valve element comprising a pair of seat engaging members slidably mounted on the stem between the abutments, a body of yieldable material mounted on the stem between the members, for cushioning the impact of one member or the other against a valve seat, and means for forcing the body of yieldable material into fluid sealing engagement with the stem when one member or the other is forced against the valve seat.

6. The combination as embodied in claim 5 wherein the last means comprises beads on the opposed sides of the body of yieldable material in surrounding relation to the stem, and cam grooves in the members receiving the beads.

7. In a valve, a valve stem having a pair of spaced abutments thereon, a reversible valve element comprising a pair of seat engaging members slidably mounted on the stem between the abutments, and a body of yieldable material mounted on the stem and interposed between the members for cushioning the impact of the latter against a valve seat, the body of yieldable material having recesses receiving the members to provide lips on the body of yieldable material surrounding the marginal edges of the members, engageable with the valve seat to form a fluid tight seal between the valve element and seat when the members are forced against the seat.

8. In a valve, a valve stem having a pair of spaced abutments thereon, a reversible valve element comprising a pair of seat engaging members slidably mounted on the stem between the abutments, a body of yieldable material mounted on the stem and interposed between the members for cushioning the impact of the latter against a valve seat, the body of yieldable material having recesses receiving the members to provide lips on the body of yieldable material surrounding the marginal edges of the members, engageable with the valve seat to form a fluid tight seal between the valve element and seat when the members are forced against the seat, and means for forcing the body of yieldable material into fluid sealing engagement with the stem when the members are forced against the valve seat.

9. In a valve, a valve stem having a pair of spaced abutments thereon, a reversible valve element comprising a pair of seat engaging members slidably mounted on the stem between the abutments, a body of yieldable material mounted on the stem and interposed between the members for cushioning the impact of the latter against a valve seat, the body of yieldable material having recesses receiving the members to provide lips on the body of yieldable material surrounding the marginal edges of the members, engageable with the valve seat to form a fluid tight seal between the valve element and seat when the members are forced against the seat, and means for forcing the body of yieldable material into fluid sealing engagement with the stem when the members are forced against the valve seat, comprising annular beads on the opposed sides of the body of yieldable material in surrounding relation to the stem, and annular cam grooves on the members receiving the beads.

10. A reversible pump valve comprising a cage having an annular valve seat and an axial valve guide, a valve stem having an abutment intermediate its ends and provided with identical extremities, either of which is adapted to be slidably received in said guide, a valve element comprising a pair of seat engaging members slidably mounted on the stem, a nut threaded on the stem for confining the members between the abutment and nut, and a body of yieldable material mounted on the stem between the members for cushioning the impact of one member or the other against the valve seat.

11. A reversible pump valve comprising a cage having an annular valve seat and an axial valve guide, a valve stem having an abutment intermediate its ends and provided with identical extremities, either of which is adapted to be slidably received in said guide, a valve element comprising a pair of seat engaging members slidably mounted on the stem, a nut threaded on the stem for confining the members between the abutment and nut, a body of yieldable material mounted on the stem between the members for cushioning the impact of one member or the other against the valve seat, and means for forcing the body of yieldable material into fluid sealing engagement with the stem when one member or the other is forced against the valve seat.

12. A reversible pump valve comprising a cage having an annular valve seat and an axial valve guide, a valve stem having an abutment intermediate its ends and provided with identical extremities, either of which is adapted to be slidably received in said guide, a valve element comprising a pair of seat engaging members slidably mounted on the stem, a nut threaded on the stem for confining the members between the abutment and nut, a body of yieldable material mounted on the stem between the members for cushioning the impact of one member or the other against the valve seat, and means for forcing the body of yieldable material into fluid sealing engagement with the stem when one member or the other is forced against the valve seat, the body of yieldable material having recesses receiving the members, to provide portions surrounding the marginal edges of the members, engageable with the valve seat to form a fluid tight seal between the valve element and seat when the members are forced against the seat.

13. In a valve, a valve stem, a reversible valve element comprising a pair of seat engaging members slidably mounted on the stem, and a body of yieldable material interposed between the members for cushioning the impact of one member or the other against a valve seat.

14. In a valve, a valve stem, a reversible valve element comprising a pair of seat engaging members slidably mounted on the stem, and a body of yieldable material interposed between the members for cushioning the impact of one member or the other against a valve seat, the body of yieldable material having portions engageable with the valve seat according as one member or the other engages the seat, to form a fluid tight seal between the valve element and seat.

15. In a valve, a valve stem having a pair of spaced abutments thereon, a reversible valve element comprising a pair of seat engaging members slidably mounted on the stem between the abutments, and a body of yieldable material interposed between the members for cushioning the impact of one member or the other against a valve seat.

16. In a valve, a valve stem having a pair of spaced abutments thereon, a reversible valve element comprising a pair of seat engaging members slidably mounted on the stem between the abutments, and a body of yieldable material interposed between the members, for cushioning the impact of one member or the other against a valve seat, the body of yieldable material having portions engageable with the valve seat according as one member or the other engages the seat to form a fluid tight seal between the valve element and seat.

17. In a valve, a valve stem, a reversible valve element comprising a pair of seat engaging members slidably mounted on the stem, a body of yieldable material interposed between the members for cushioning the impact of one member or the other against a valve seat, and means for forcing the body of yieldable material into fluid sealing engagement with the valve stem according as one member or the other engages the valve seat.

18. In a valve, a valve stem, a reversible valve element comprising a pair of seat engaging members slidably mounted on the stem, and a body of yieldable material interposed between the members for cushioning the impact of one member or the other against a valve seat, the body of yieldable material having recesses receiving the members and providing lips surrounding the members and engageable with the valve seat to form a fluid tight seal between the valve element and seat according as one member or the other is forced against the seat.

19. In a valve of the character described, a valve stem, a valve element having a member slidably mounted on the stem, said member being adapted to engage with a valve seat on one side thereof, and means positioned on the opposite side of said member and surrounding said stem operable by fluid pressure thereagainst to produce a fluid-tight seal between said member and said stem when said member is forced against a valve seat by fluid pressure.

20. In a valve of the character described, a valve stem, a valve element having a member slidably mounted on the stem, said member being adapted to engage with a valve seat on one side thereof, and means positioned on the opposite side of said member and surrounding said stem operable by fluid pressure thereagainst to produce a fluid-tight seal between said member and said stem and between said member and a valve seat when said member is forced against a valve seat by fluid pressure.

JOHN L. PATERSON.
ALBERT B. EDWARDS.